Jan. 23, 1968   J. P. STEIBEL   3,364,796
CHAIN SAW SHARPENER
Filed Jan. 17, 1966   3 Sheets-Sheet 2
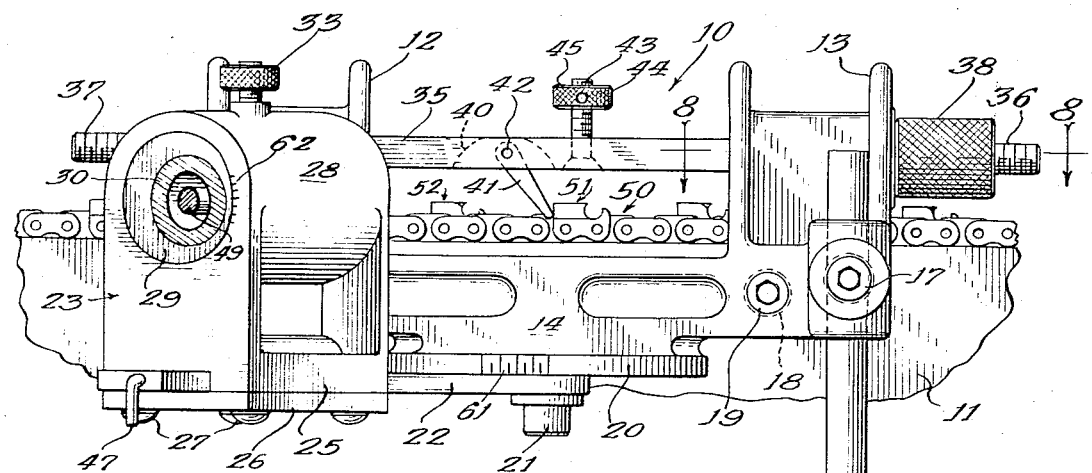
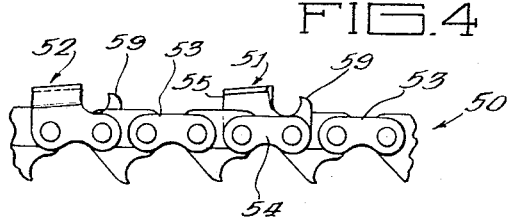
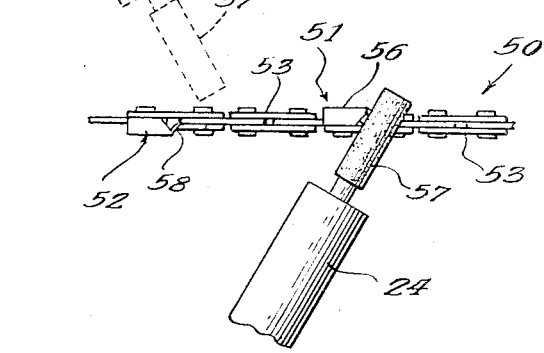

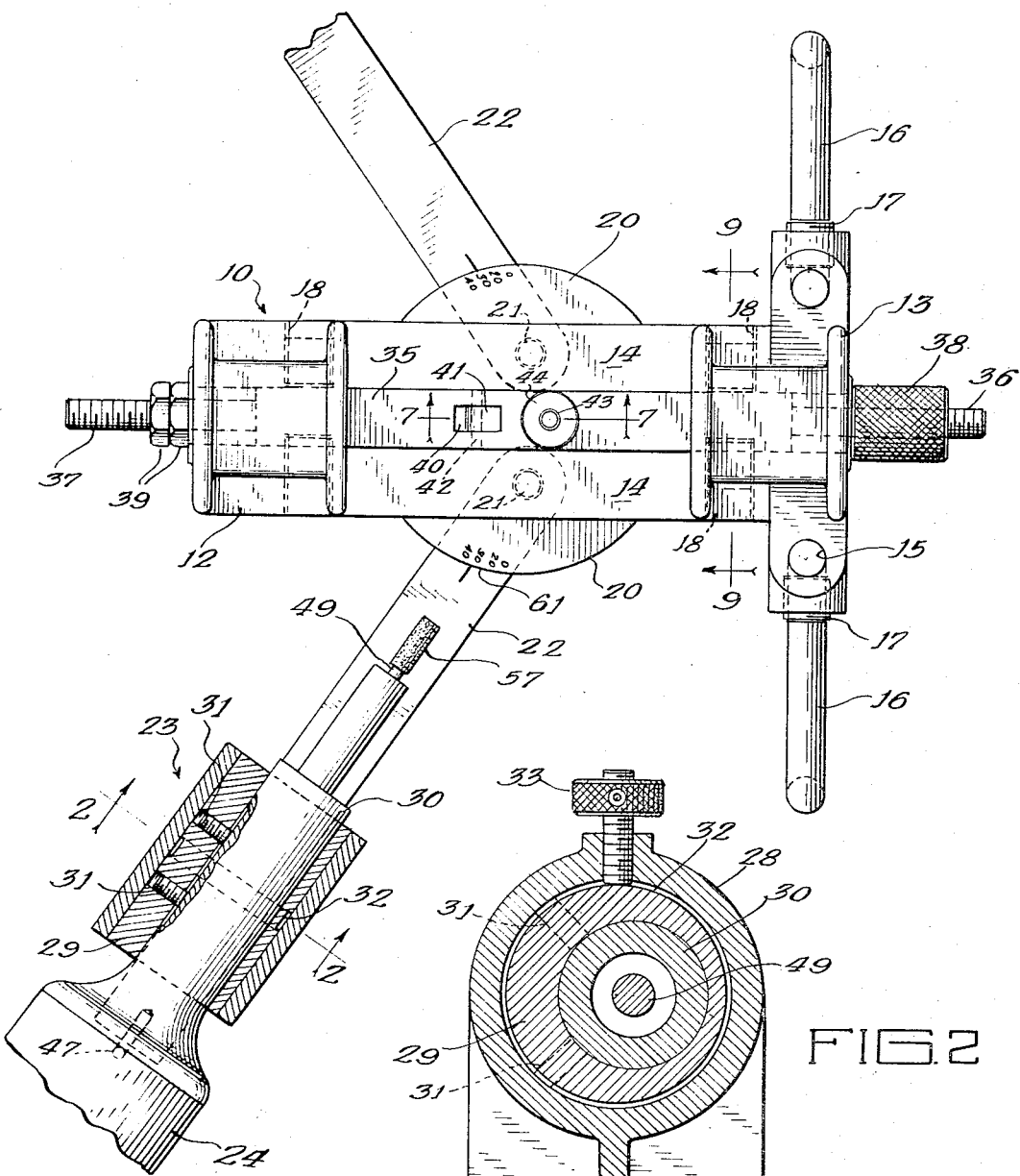

Jan. 23, 1968   J. P. STEIBEL   3,364,796
CHAIN SAW SHARPENER

Filed Jan. 17, 1966   3 Sheets-Sheet 3

3,364,796
CHAIN SAW SHARPENER
James P. Steibel, Sturtevant, Wis., assignor to The Dumore Company, Racine, Wis., a corporation of Wisconsin
Filed Jan. 17, 1966, Ser. No. 521,094
8 Claims. (Cl. 76—40)

ABSTRACT OF THE DISCLOSURE

A chain saw sharpener comprises a slotted body portion which fits over the blade and is clamped thereto in a centered relationship by two pairs of set screws. The body portion has two adjustable downwardly diverging legs, received in vertical bores and secured by set screws. A pawl is mounted on a horizontal support bar for indexing the teeth, and the longitudinal position of the support bar with respect to the body portion is adjusted by a threaded nut. A gauge screw is mounted on the support bar for vertically locating the body portion with respect to the saw blade.

The body portion includes two laterally extending slide bars, and a grinder is arranged for slidable mounting on either slide bar. An eccentric sleeve permits vertical adjustment of the grinder axis with respect to the slide bar. Each slide bar is angularly adjustable in a horizontal plane.

---

This invention relates to an improved chain saw sharpener, particularly adapted for sharpening the cutter teeth of a chain saw of the router type.

In the router type of chain saw, the cutter teeth are in the form of two series of routers, a left hand series, and a right hand series. The outer end of each tooth is bent over and disposed in a plane perpendicular to the plane of the saw blade. The cutting edge of each tooth is formed by the intersection of a cylindrical surface with the outer surface of the bent tooth, and the sharpening is effected by a cylindrical burr or grinding wheel.

The present chain saw sharpener is of the type which embodies a slidably mounted grinder for sharpening both the left hand and the right hand series of teeth. An example of a sharpener of this type is shown in Bluemink Patent No. 2,729,987, granted Jan. 10, 1956.

An object of my invention is to provide a self-contained sharpener which requires no additional jig or saw blade holding means, but which is self-contained in that in itself it provides means for supporting a saw blade during the sharpening operation and for maintaining the blade and the chain clear of the horizontal supporting surface so that the chain may be advanced step by step to sharpen successive teeth of a given series.

Another object is to provide a sharpener which can be assembled to a saw blade in centered relationship without the use of bolts which pass through the blade.

According to my invention, the sharpener includes a body member which straddles the blade and chain and is clamped to the blade, and which also includes two supporting legs, which, in conjunction with the handle of the saw, provide a three point support which maintains the outer end of the saw blade elevated above the table surface and in a vertical plane, convenient for the sharpening operation.

Also, by virtue of the straddling relationship, it is possible to provide a symmetrical arrangement which includes two slide bars for the grinder so that both series of teeth can be sharpened without removing the body member from the saw blade, and without the necessity of resetting the tooth indexing device.

Other objects, features and advantages will become apparent as the description proceeds.

With reference now to the drawings in which like reference numerals designate like parts:

FIG. 1 is a plan view of a preferred embodiment of my invention, a part of the grinder carriage being shown in section;

FIG. 2 is a vertical section through the grinder carriage taken along line 2—2 of FIG. 1;

FIG. 3 is a side elevation of FIG. 1;

FIG. 4 is an elevation of a chain which is to be sharpened;

FIG. 5 is a top view of the chain showing the relationship between one tooth and the grinder, and showing in dotted lines the angular position of the grinder when sharpening the opposite tooth series;

Figure 7:
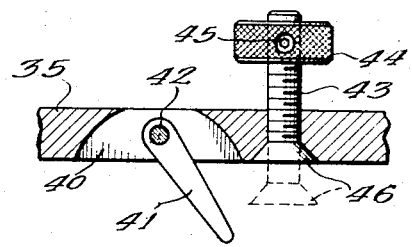
FIG. 7 is a detailed vertical section showing the pawl and clamping gauge.
Figure 6:
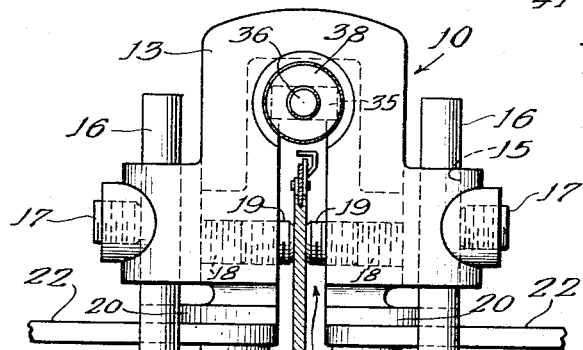
FIG. 6 is a right end view of FIG. 3, showing the saw blade in section.
Figure 8:
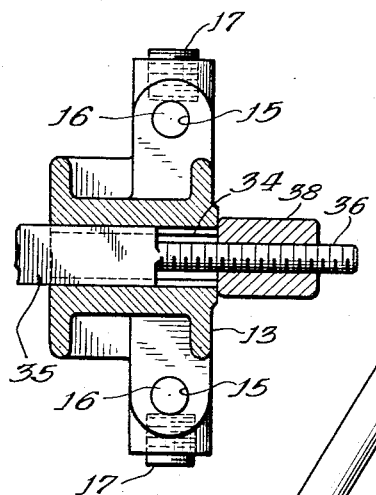
FIG. 8 is a horizontal section taken along line 8—8 of FIG. 3.

Referring now to FIGS. 1, 3 and 6, the sharpener comprises a slotted body portion 10 which straddles the top edge of a saw blade 11 and is removably secured thereto. The body portion includes rear and front U-shaped end portions 12 and 13 and spaced side plates 14. Vertical bores 15 are provided in the front end portion 13 for receiving legs 16, the lower ends of which are downwardly diverging. The legs 16 are secured in the bores 15 by set screws 17.

Figure 9:
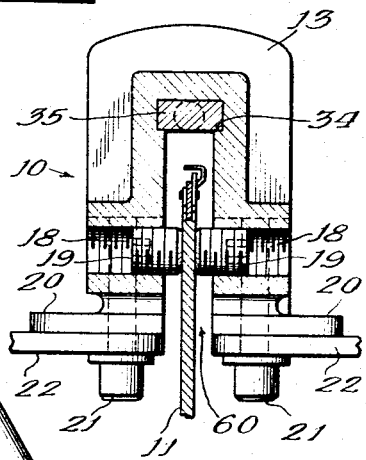
FIG. 9 is a vertical section taken along line 9—9 of FIG. 1.
Figure 10:
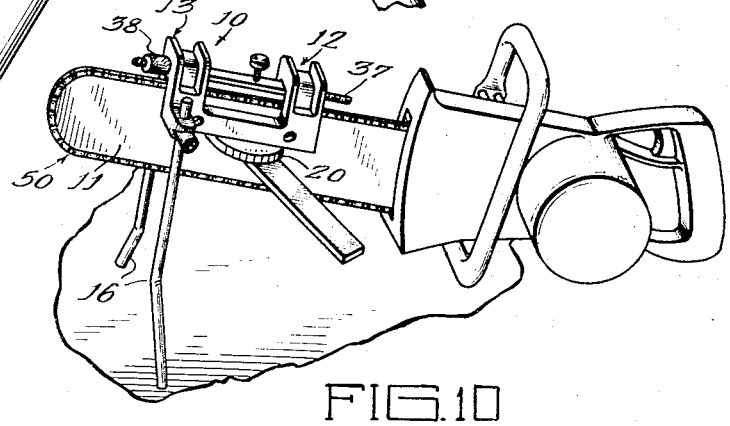
FIG. 10 is a perspective view of the chain saw with the sharpener mounted thereon and providing a support for the outer end thereof.

The end portions 12 and 13 are each provided with oppositely disposed tapped horizontal bores 18 which receive clamping screws 19. As shown in FIG. 9, the clamping screws 19 are screwed up into engagement with the saw blade 11 so that the saw blade is clamped and centered in the slot 60. Thus the sharpener can be mounted on the saw blade and provide a support for the outer end thereof which maintains the blade and the chain clear of the table or other supporting surface.

Each side plate 14 has integrally formed on its lower edge a half sector 20. A screw 21 takes into the lower surface of each sector 20 and provides means for mounting a slide arm 22, as shown in FIGS. 1 and 6. A grinder carriage 23 is slidably mounted on one of the slide arms, and carries a grinder 24. The carriage 23, as shown in FIG. 2, comprises a grooved base 25 having a slide plate 26 secured to the lower surface thereof by screws 27. The base 25 and the slide plate 26 thus embrace the slide arm 22, and the screws 27 are set to permit longitudinally sliding movement. The carriage also includes a tubular holder 28 which receives the shank 30 of the grinder 24. An eccentric sleeve 29 is disposed between the tubular holder 28 and the shank 30, and is secured to the shank by set screws 31. The eccentric sleeve 29 provides a means for vertically adjusting the horizontal axis of the grinder 24 and hence the vertical position of the burr 57.

The sleeve 29 is provided with a circumferential groove 32 which cooperates with a set screw 33 mounted in the top of the tubular holder 28. Thus, by loosening the set screw 33 the assembly comprising the grinder 24 and the eccentric sleeve 29 may be rotated to provide the desired elevation of the grinder shaft 49.

The indexing device includes a pawl support bar 35 which is mounted in the two end portions 12 and 13 as shown in FIG. 9. These are provided with slots 34 for accommodating the support bar 35. The support bar is provided with screw threaded ends 36 and 37. A knurled positioning knob 38 is screwed on to the front threaded end 36, and jam nuts 39 are screwed on to the rear threaded end 37. Thus, by loosening the jam nuts 37, the longitudinal position of the support bar 35 can be adjusted by rotating the positioning knob 38. A slot 40 is formed in the support bar 35, and a pawl 41 is pivotally mounted in the slot 40 by a pin 42. It will be seen from FIG. 3 that the chain 50 may be advanced forwardly, that is, from left to right, the pawl 41 camming over the teeth of the chain. However, when the movement of the chain is reversed, the pawl 41 acts as a cam and forces the tooth downwardly against the upper edge of the saw blade 11, and also determines the horizontal position of the tooth with great accuracy.

A gauge screw 43 is threaded into the pawl support bar 35 as shown in FIG. 3, and has secured to its upper end, a knurled gauge nut 44 which is locked to the screw by a set screw 45. The gauge screw 43 provides a means for locating the sharpener body 10 with respect to the saw blade 11.

Before the sharpener is placed on the blade, the gauge nut 44 is spun so that the gauge screw 43 is extended downwardly until the gauge nut 44 engages the upper surface of the support bar 35. Then the body 10 is placed over the saw blade with the foot 46 of the gauge screw 43 engaging the upper surface of the tooth. Then the clamping screws 19 are tightened up, the support bar 35 being maintained parallel to the upper edge of the saw blade 11 during the tightening operation. As a result, the sharpener can be mounted on the blade in such a manner that the axis of the grinder shaft 49 is properly aligned with the cutting edge of the tooth. Although the setting of the gauge nut 44 with respect to the gauge screw 43 is fixed, adjustment can be made for different types of chain. Thus, the gauge screw assembly provides a rapid and convenient means for locating the sharpener on the saw blade.

The chain 50 is shown in FIGS. 4 and 5. It comprises one series of right hand cutter teeth 51, a series of left hand cutter teeth 52, and suitable connecting links 53. Each cutter tooth comprises a vertical portion 54, a curved end offset shank portion 55, and a horizontal top portion 56. A cylindrical burr 57 grinds a cylindrical cutting surface 58 which provides the cutting edge. The vertical portion 54 also includes a gauge tooth 59. The horizontal top portion 56 has a slight slope downwardly and rearwardly.

When the grinder 24 is on the right hand side of the sharpener, looking toward the front, it can be made to engage the cutting surface 58 of a right hand cutter tooth 51, as shown in FIG. 5, thus grinding a fresh cutting surface 58. The angle of the grinder axis with respect to the plane of the saw blade is preferably about 35°, and both slide arms 22 are set accordingly. Then when the right hand series of teeth have been sharpened, the carriage 23 is removed frrom the right hand slide arm 22 and placed on the left hand slide arm 22 in which the angular position of the parts will be as shown in dotted lines in FIG. 5. The dotted line showing of FIG. 5 has been offset rearwardly for purpose of clarity, but it will be understood that the longitudinal position of the tooth being ground is the same for a left hand tooth as for a right hand tooth, being determined by the pawl 41.

The blades of chain saws are commonly made in thicknesses of 3/16 inch, 1/4 inch, and 5/16 inch. In order to maintain the relative position of the grinder axis and the right hand series of teeth identical to the relative position of the grinder axis and the left hand series of teeth, it is necessary that the blade be centered in the slot 60. This identity of relationship is obtained by the use of two sets of clamping screws 19, one set for each side of the saw blade 11. Thus the saw blade and the saw chain can be centered irrespective of variations in blade thickness.

Other relationships between the right-hand teeth and the grinder axis which must be maintained identical to the relationships between the left-hand teeth and the grinder axis are the vertical relationship, the horizontal relationship and the longitudinal direction, and the angular relationship.

The horizontal relationship is determined by regulating the longitudinal position of the tooth with respect to the blade by means of the pawl 41 and the positioning knob 38. A single setting is used for both series of teeth.

The vertical relationship is identical because the two slide arms 22 are aligned with each other in the same horizontal plane. If a separate carriage and grinder assembly 23–24 were used for each slide arm, then the vertical position of one grinder axis is regulated with respect to the other by means of the eccentric sleeve 29.

The angular relationship is determined by swinging the slide arms 22, and in this connection indicia 61 (FIG. 1) are provided on the sectors 20 to facilitate identical adjustment.

As shown in FIGS. 1 and 2, the grinder axis is centered with respect to the slide arm 22, the slide arm in this respect being eccentric to the carriage 23 to the same extent that the grinder axis is eccentric to the carriage, e.g. 1/8 inch. The end face of the tubular holder 28 may be marked off in several 5° increments 62 (FIG. 3), each representing about .01 inch of elevation. Thus it is possible to obtain a fine regulation of vertical position above or below the position shown in FIG. 2 in which the grinder axis is at the same elevation as the axis of the tubular holder 28. Rotation of the grinder 24 and the eccentric sleeve 29 produces only a negligible variation in the horizontal relationship throughout 15 or 20 degrees rotation in either direction from the zero point.

To summarize the operation, when it is desired to sharpen a chain saw, blade 11 is placed within the slot 60 and maintained in a centered relationship while the clamping screws 19 are tightened up. The elevation of the saw blade within the slot is determined by the clamping gauge 43–44.

The advantage of this arrangement is that it is not necessary to hold the blade in a vise during the sharpening operation. It can be set on any horizontal surface which is available at the site of the logging operation, such as the tailgate of a truck.

Then the assembly which comprises the carriage 23 and the grinder 24 is placed on one of the slide arms where it may be moved back and forth so that the burr 57 engages the cutter teeth of one series, such as the right-hand cutter teeth 51. A bent pin received within the end surface of the slide arm 22 serves as a stop 47 which prevents inadvertent removal of the carriage 23. In removing or replacing the carriage 23, the stop 47 is swung from the vertical position shown in FIG. 3 up to the horizontal position wherein it will be received within the groove of the base 25.

The longitudinal position of the teeth is determined by adjustment of the positioning knob 38, and once a particular setting has been made, each tooth of a series will be ground to identical length. Due to the arrangements pointed out above, which include the centered relationship within the slot 60 and the identical angular relationship of the slide arms 22, the length of the teeth of one series will be identical to the length of the teeth of the other series provided that the setting of the positioning knob 38 is maintained for both series.

As the chain is advanced manually to bring successive teeth of a given series into the grinding position, the pawl 41 cams over the intervening tooth of the other series, as well as the next tooth of the same series. Then a slight tug on the chain in the reverse direction will urge the tooth downwardly so that it is firmly seated within the track or groove of the blade, and at the same time the longitudinal position of the tooth will be determined for the sharpening operation.

When all of the teeth of one series have been sharpened, the stop 47 is swung upwardly, the carriage and grinder assembly is removed from the one slide bar 22 and placed on the opposite slide bar 22, and the grinding operation is repeated for the other series of teeth.

The graduations 62 permit a fine vertical regulation to be made in the cutting surface 58. The indicia 61 permit slight changes to be made in the angular disposition of the cutting surface 58 in accordance with the type of wood which is being cut. It will be understood that the mounting screws 21 are at all times screwed up very firmly so that the slide arms 22 are maintained in identical fixed positions. They are loosened only when it is necessary to change the angular relationship.

The elevation of the blade 11 above the horizontal supporting surface can be regulated by adjusting the leg length by means of the set screws 17.

Although only a preferred embodiment of my invention has been shown and described herein, it will be apparent that various modifications and changes may be made in the construction shown without departing from the spirit of my invention as pointed out in the appended claims.

I claim:

1. A sharpener for a chain saw having a blade and a saw chain, said chain having two series of teeth, alternate teeth having cutting edges oriented with respect to the opposite sides of said blade, said sharpener comprising a slotted body portion for straddling the top edge of said saw blade, means for clamping said body portion to said saw blade comprising oppositely disposed screw threaded means extending through each half of said body portion and into the slot of said slotted body portion and into engagement with said blade, leg means extending from said body portion for maintaining said body portion and one end of the saw blade in an elevated position, symmetrically located slide bars extending laterally from said body portion on opposite sides thereof and a grinding tool slidably mounted on one of said slide bars for grinding one series of teeth and adapted to be slidably mounted on the other one of said slide bars for grinding the other series of teeth, and indexing means for determining the longitudinal position of a tooth with respect to the axis of said grinding tool, said clamping means permitting said blade to be centered with respect to said body portion so that the relationship of said one slide bar to said one series of teeth is substantially identical to the relationship of said other slide bar to said other series of teeth.

2. A chain saw sharpener as claimed in claim 1 which includes screw threaded clamping means for securing said slide bars to said body portion.

3. A chain saw sharpener as claimed in claim 2 in which said body portion includes oppositely disposed spaced side plates, each side plate having formed on its lower edge a half sector having a smooth undersurface, said screw threaded clamping means comprising a clamping screw taking into said smooth undersurface, and indicia on each said half sector indicating the angular position of each slide bar with respect to the plane of said blade.

4. A chain saw sharpener as claimed in claim 1 in which said body portion includes front and rear inverted U-shaped end portions, side plates connecting said end portions, said front end portion having two substantially vertical bores, one on each side of said blade, and said leg means including a leg extending into each of said bores.

5. A sharpener for a chain saw having a blade and a saw chain, said chain having two series of teeth, alternate teeth having cutting edges oriented with respect to the opposite sides of said blade, said sharpener comprising a slotted body portion for straddling the top edge of said saw blade, means for clamping said body portion to said saw blade, leg means extending from said body portion for maintaining said body portion and one end of the saw blade in an elevated position, slide bars extending laterally from said body portion on opposite sides thereof and a grinding tool slidably mounted on one of said slide bars for grinding one series of teeth and adapted to be slidably mounted on the other one of said slide bars for grinding the other series of teeth, indexing means for determining the longitudinal position of a tooth with respect to the axis of said grinding tool, said indexing means comprising a pawl support bar slidably mounted in said body portion over said saw blade, an indexing pawl pivotally mounted on said support bar and extending down into engagement with one of said teeth, and means for regulating the longitudinal position of said pawl support bar with respect to said body portion, and clamping gauge means for determining the vertical position of said saw blade with respect to said slotted body portion, said clamping gauge means comprising a gauge screw extending through said pawl support bar in screw threaded engagement therewith, the lower end of said gauge screw engaging a portion of said chain, and means for limiting the movement of said gauge screw in the downward direction.

6. A sharpener for a chain saw having a blade and a saw chain, said chain having two series of teeth, alternate teeth having cutting edges oriented with respect to the opposite sides of said blade, said sharpener comprising a slotted body portion for straddling the top edge of said saw blade, means for clamping said body portion to said saw blade, leg means extending from said body portion for maintaining said body portion and one end of the saw blade in an elevated position, slide bars extending laterally from said body portion on opposite sides thereof and a grinding tool slidably mounted on one of said slide bars for grinding one series of teeth and adapted to be slidably mounted on the other one of said slide bars for grinding the other series of teeth, indexing means for determining the longitudinal position of a tooth with respect to the axis of said grinding tool, and a carriage slidably mounted on one of said slide bars, said carriage including a tubular holder, said grinding tool having a portion received within said tubular holder, and an eccentric sleeve disposed between said tubular holder and said grinding tool portion, said eccentric sleeve being nonrotatably secured to said grinding tool portion, and means permitting rotation of said eccentric sleeve with respect to said tubular holder to adjust the vertical position of said grinding tool with respect to said slide bar.

7. In a chain saw sharpener having symmetrically located slide bars extending laterally from a body portion on opposite sides thereof and a grinding tool slidably mounted on one of said slide bars for grinding one series of teeth and adapted to be slidably mounted on the other one of said slide bars for grinding an opposite series of teeth, said body portion having a downwardly facing slot formed therein for straddling the top edge of the blade of the chain saw to be sharpened, the combination of means for clamping said body portion to said blade, said clamping means comprising oppositely disposed screw threaded means extending horizontally through each half of said body portion and into said slot and into engagement with said blade for centering said blade within said slot so that the relationship of said one slide bar to said one series of teeth is substantially identical to the relationship of said other slide bar to said opposite series of teeth, said body portion having two substantially vertical through bores, one on each side of said slot, a leg extending into each of said bores, means for clamping each leg in its respective bore in order that the length of each leg may be adjusted, said legs extending downwardly from said body portion and providing an adjustable means for supporting said body portion and the blade end of said chain saw, said legs and said body portion and said clamping means maintaining said saw blade in a vertical plane with said blade elevated above a substantially horizontal supporting surface to permit manipulation of the chain of said saw blade with respect to said grinding tool.

8. A chain saw sharpener as claimed in claim 7 in which the lower ends of said legs are downwardly diverging.

References Cited

UNITED STATES PATENTS

| | | | |
|---|---|---|---|
| 2,594,821 | 4/1952 | Stone et al. | 76—31 |
| 2,677,289 | 5/1954 | Fitch | 76—31 |
| 2,693,724 | 11/1954 | Currie | 76—31 |
| 2,729,987 | 1/1956 | Bluemink | 76—37 |
| 2,805,587 | 9/1957 | Goehle | 76—41 |
| 2,833,166 | 5/1958 | Wilson et al. | 76—41 |

GRANVILLE Y. CUSTER, Jr., *Primary Examiner.*